(12) United States Patent
Lutz et al.

(10) Patent No.: US 9,181,463 B2
(45) Date of Patent: Nov. 10, 2015

(54) STRUCTURAL EPOXY RESIN ADHESIVES CONTAINING CHAIN-EXTENDED ELASTOMERIC TOUGHENERS CAPPED WITH PHENOL, POLYPHENOL OR AMINOPHENOL COMPOUNDS

(75) Inventors: Andreas Lutz, Galgenen (CH); Daniel Schneider, Wadenswil (CH); Christof Braendli, Zurich (CH); Irene Maeder, Rapperswil (CH)

(73) Assignee: Dow Global Technologies LLC, Midland, MI (US)

( * ) Notice: Subject to any disclaimer, the term of this patent is extended or adjusted under 35 U.S.C. 154(b) by 135 days.

(21) Appl. No.: 13/821,748

(22) PCT Filed: Nov. 30, 2011

(86) PCT No.: PCT/US2011/062491
§ 371 (c)(1),
(2), (4) Date: Mar. 8, 2013

(87) PCT Pub. No.: WO2012/091842
PCT Pub. Date: Jul. 5, 2012

(65) Prior Publication Data
US 2013/0263995 A1  Oct. 10, 2013

Related U.S. Application Data

(60) Provisional application No. 61/427,192, filed on Dec. 26, 2010.

(51) Int. Cl.
| C09J 163/00 | (2006.01) |
| C09J 175/04 | (2006.01) |
| C09J 5/00   | (2006.01) |
| C08G 18/10  | (2006.01) |
| C08G 18/12  | (2006.01) |
| C08G 18/48  | (2006.01) |
| C08G 18/66  | (2006.01) |
| C08G 18/73  | (2006.01) |
| C09J 155/00 | (2006.01) |
| B32B 27/38  | (2006.01) |

(52) U.S. Cl.
CPC .............. *C09J 163/00* (2013.01); *C08G 18/10* (2013.01); *C08G 18/12* (2013.01); *C08G 18/4854* (2013.01); *C08G 18/6677* (2013.01); *C08G 18/73* (2013.01); *C09J 5/00* (2013.01); *C09J 155/00* (2013.01); *Y10T 156/10* (2015.01)

(58) Field of Classification Search
None
See application file for complete search history.

(56) References Cited

U.S. PATENT DOCUMENTS

| 3,686,359 | A | 8/1972 | Soldatos et al. |
| 4,553,676 | A | 11/1985 | Zimmermann |
| 4,701,378 | A | 10/1987 | Bagga et al. |
| 4,734,332 | A | 3/1988 | Bagga et al. |
| 5,112,932 | A | 5/1992 | Koenig et al. |
| 5,202,390 | A | 4/1993 | Mulhaupt et al. |
| 5,278,257 | A | 1/1994 | Mulhaupt et al. |
| 6,015,865 | A | 1/2000 | Blank et al. |
| 6,884,854 | B2 | 4/2005 | Schoenfeld et al. |
| 7,786,214 | B2 | 8/2010 | Kramer |
| 7,897,688 | B2 | 3/2011 | Gerber et al. |
| 8,062,468 | B2 | 11/2011 | Finter et al. |
| 8,071,217 | B2 | 12/2011 | Kramer et al. |
| 8,076,424 | B2 | 12/2011 | Kramer et al. |
| 8,114,519 | B2 | 2/2012 | Kramer et al. |
| 8,202,920 | B2 | 6/2012 | Kramer et al. |
| 8,747,605 | B2 * | 6/2014 | Lutz et al. .................. 156/330 |
| 2004/0181013 | A1 | 9/2004 | Schenkel |
| 2005/0022929 | A1 | 2/2005 | Schoenfeld et al. |
| 2005/0070634 | A1 | 3/2005 | Lutz et al. |
| 2005/0078088 | A1 | 4/2005 | Davis et al. |
| 2005/0209401 | A1 | 9/2005 | Lutz et al. |
| 2006/0276601 | A1 | 12/2006 | Lutz et al. |
| 2007/0105983 | A1 | 5/2007 | Kramer et al. |
| 2008/0073029 | A1 | 3/2008 | Kramer |
| 2008/0076886 | A1 | 3/2008 | Burns et al. |
| 2009/0264558 | A1 | 10/2009 | Kramer et al. |
| 2010/0273005 | A1 | 10/2010 | Kramer et al. |

FOREIGN PATENT DOCUMENTS

| EP | 307666 A1 * | 3/1989 | .............. C08G 18/10 |
| EP | 0343676 B1 | 5/1995 | |
| EP | 1728825 B1 | 3/2010 | |
| EP | 1896517 B1 | 11/2012 | |
| EP | 1632533 B1 | 4/2013 | |
| WO | 03078163 A1 | 9/2003 | |
| WO | 2005118734 A1 | 12/2005 | |
| WO | 2006128722 A1 | 12/2006 | |
| WO | 2007025007 A1 | 3/2007 | |
| WO | 2008016889 A1 | 2/2008 | |
| WO | WO 2010019539 A2 * | 2/2010 | .............. C09J 163/00 |
| WO | WO 2010098950 A1 * | 9/2010 | .............. C09J 163/00 |
| WO | 2012091842 A2 | 7/2012 | |

OTHER PUBLICATIONS

Kreiling, Stefan, et al., Abstract for WO2008151946, Adhesive Compositions, Henkel AG & Co., KGAA, Dec. 18, 2008.
Ichinose, Eiju, et al., Abstract for JP2008308580A, "Thermosetting Polyimide Resin Composition", Dainippon Ink & Chemicals, Dec. 25, 2008.
Mulhaupt, Rolf, et al., Abstract for EP0307666, Phenol-terminated Polyurethanes or Polyurea, and Epoxy Resins Containing These Compounds, Ciba Geigy AG, Mar. 22, 1989.
Mulhaupt, R., et al., EP0307666A1, Translation, Mar. 22, 1989, "Phenol-terminated polyurethanes or polyurea, and epoxy resins containing these compounds", Ciba Geigy AG, Parts 1 and 2.

* cited by examiner

Primary Examiner — Michael J Feely

(57) ABSTRACT

Structural adhesives are prepared from a chain extended elastomeric toughener that contains urethane and/or urea groups, and have terminal isocyanate groups that are capped with a phenol, a polyphenol or an aminophenol compound. The adhesives have very good storage stability and cure to form cured adhesives that have good lap shear and impact peel strengths.

14 Claims, No Drawings

STRUCTURAL EPOXY RESIN ADHESIVES CONTAINING CHAIN-EXTENDED ELASTOMERIC TOUGHENERS CAPPED WITH PHENOL, POLYPHENOL OR AMINOPHENOL COMPOUNDS

CROSS REFERENCE TO RELATED APPLICATIONS

This application claims the benefit of U.S. Provisional Application Ser. No. 61/427,192 filed Dec. 26, 2010.

This invention relates to an epoxy-based structural adhesive containing a chain-extended elastomeric toughener having terminal isocyanate groups blocked with a phenol, polyphenol or aminophenol compound.

Epoxy resin based adhesives are used in many applications. In the automotive industry, epoxy resin adhesives are used in many bonding applications, including metal-metal bonding in frame and other structures in automobiles. Some of these adhesives must strongly resist failure during vehicle collision situations. Adhesives of this type are sometimes referred to as "crash durable adhesives", or "CDAs".

In order to obtain the good balance of properties that are needed to meet automotive performance requirements, epoxy adhesives are often formulated with various rubbers and/or "tougheners". The tougheners have blocked functional groups which, under the conditions of the curing reaction, can become de-blocked and react with an epoxy resin. Tougheners of this type are described, for example, in U.S. Pat. No. 5,202,390, U.S. Pat. No. 5,278,257, WO 2005/118734, U.S. Published Patent Application No. 2005/0070634, U.S. Published Patent Application No. 2005/0209401, U.S. Published Patent Application 2006/0276601, EP-A-0 308 664, EP-A 1 728 825, EP-A 1 896 517, EP-A 1 916 269, EP-A 1 916 270, EP-A 1 916 272 and EP-A-1 916 285.

Various types of groups have been suggested for blocking the isocyanate groups of the prepolymer. Among these are various phenols, polyphenols and aminophenols, as described, for example, in U.S. Pat. No. 5,278,257 to Mulhaupt. EP-A 1 916 269 describes a toughener containing both epoxy and phenol blocking groups. Phenol, polyphenol and aminophenol materials constitute a very suitable class of capping groups, because cured adhesives made using tougheners capped with these groups tend to have very good properties. As described in U.S. Published Patent Application No. 2005/0209401, adhesives containing such tougheners often exhibit, when cured, very good impact peel strengths at low temperatures. A problem with tougheners capped with these groups is that the adhesive composition containing them is not sufficiently storage-stable. See, e.g., EP 1,498 441 A1 and WO 2007/003650). These adhesives prematurely begin to advance in molecular weight. Because of this, the adhesive can thicken or even gel to the point that it cannot be dispensed properly, does not adhere well to the substrate or form a strong cured adhesive layer, or otherwise is no longer usable. Since these adhesives are usually packaged up to several months before they are ultimately used, a lack of storage stability represents a very serious practical problem. It is desirable to provide a one-part adhesive that contains a toughener capped with phenol, polyphenol or aminophenol groups, which adhesive has good storage stability and retains good adhesive properties.

This invention is a one-part structural adhesive comprising:
A) at least one epoxy resin;
B) a reactive elastomeric toughener containing capped isocyanate groups; and
C) one or more epoxy curing agents;

wherein the elastomeric toughener is formed by
a) reacting an excess of a polyisocyanate with a 300-3000 equivalent weight polyol or with a mixture of a 300-3000 equivalent weight polyol and a branching agent, to form an isocyanate-terminated prepolymer;
b) reacting the isocyanate-terminated prepolymer with a chain extender to produce a chain extended, isocyanate-terminated prepolymer, and
c) capping at least 90% of the terminal isocyanate groups of the chain extended, isocyanate-terminated prepolymer with a capping agent selected from a monophenol, a polyphenol or an aminophenol.

Surprisingly, the adhesive of the invention is significantly more storage-stable than an otherwise like adhesive which contains a phenol, polyphenol or aminophenol toughener that is not chain extended. The cured adhesive has very good properties, notably good lap shear and impact peel strength. Lap shear and impact peel strengths are often, and unexpectedly, significantly higher than when the toughener is not chain extended.

The invention is also a method comprising applying the foregoing structural adhesive to the surfaces of two members, and curing the structural adhesive to form an adhesive bond between the two members. At least one and preferably both of the members are metals.

The toughener of the invention is elastomeric, contains urethane and/or urea groups and has terminal isocyanate groups, at least 90% of which are capped with a phenol, polyphenol or aminophenol compound.

Preferably, at least 95% and more preferably at least 98% of the isocyanate groups on the reactive toughener(s) are capped with the phenol, polyphenol or aminophenol compound. All of the isocyanate groups may be capped with the phenol, polyphenol or aminophenol compound. Up to 10%, preferably not more than 5% and still more preferably not more than 2% of the isocyanate groups may be capped with another capping agent. It is preferred that essentially none (such as 1% or fewer) of those capped isocyanate groups are capped with an epoxy-functional capping group, (i.e., a capping group that imparts epoxide functionality to the capped prepolymer) or a ketoxime capping group. Fewer than 5%, preferably fewer than 1% of the isocyanate groups may remain uncapped.

The toughener is made in a process that includes the steps of forming an isocyanate-terminated prepolymer, chain-extending the prepolymer and then capping the chain-extended prepolymer.

The prepolymer is formed by reacting an excess of a polyisocyanate with a 300-3000 equivalent weight polyol or with a mixture of a 300-3000 equivalent weight polyol and a branching agent, to form an isocyanate-terminated prepolymer.

The 300-3000 equivalent weight polyol is preferably a polyether polyol or a hydroxyl-terminated butadiene homopolymer or copolymer. The polyol preferably has 2-3, more preferably 2, hydroxyl groups per molecule.

The branching agent, for purposes of this invention, is a polyol or polyamine compounds having a molecular weight of up to 599, preferably from 50 to 500, and at least three hydroxyl, primary amino and/or secondary amino groups per molecule. If used at all, branching agents generally constitute no more than 10%, preferably no more than 5% and still more preferably no more than 2% of the combined weight of the branching agent and 300-3000 equivalent weight polyol. Examples of branching agents include polyols such as trimethylolpropane, glycerin, trimethylolethane, ethylene glycol, diethylene glycol, propylene glycol, dipropylene glycol, sucrose, sorbitol, pentaerythritol, triethanolamine, diethanolamine and the like, as well as alkoxylates thereof having a molecular weight of up to 599, especially up to 500.

The polyisocyanate may be an aromatic polyisocyanate, but it is preferably an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

An excess of the polyisocyanate compound is used, so that essentially all of the isocyanate reactive groups of the 300-3000 equivalent weight polyol and branching agent (if any) are consumed and the resulting prepolymer is terminated in isocyanate groups. It is generally preferred to combine at least 1.5 equivalents of the polyisocyanate per equivalent of the isocyanate-reactive materials (i.e., the 300-3000 molecular weight polyol and the branching agent, if any), as such a ratio minimizes the formation of materials that are advanced in molecular weight. More preferably, from 1.5 to 2.5 equivalents of the polyisocyanate are provided per equivalent of the isocyanate-reactive materials.

The prepolymer-forming reaction is performed by mixing the starting materials and heating them, preferably in the presence of a catalyst for the reaction of isocyanate groups with hydroxyl groups. The reaction mixture will typically be from 60 to 120° C., and the reaction is continued until a constant isocyanate content is obtained, indicating that all of the isocyanate-reactive groups in the starting materials have been consumed.

The resulting prepolymer preferably has an isocyanate content of from 0.5 to 7% by weight, more preferably from 1 to 6% by weight and even more preferably from 1.5 to 5% by weight. In terms of isocyanate equivalent weight, a preferred range is from 700 to 8400, a more preferred range is from 840 to 4200, and an even more preferred range is from 1050 to 2800. The prepolymer suitably contains, on average, from about 1.5, preferably from about 2.0, to about 4, preferably to about 3, and more preferably to about 2.5 isocyanate groups per molecule.

The prepolymer is then reacted with a chain extender to produce a chain extended, isocyanate-terminated prepolymer. Chain extenders, for purposes of this invention, are polyol or polyamine compounds having a molecular weight of up to 749 preferably from 50 to 500, and two hydroxyl, primary amino and/or secondary amino groups per molecule. Examples of suitable chain extenders include aliphatic diols such as ethylene glycol, diethylene glycol, triethylene glycol, propylene glycol, dipropylene glycol, tripropylene glycol, 1,4-butanediol, 1,6-hexane diol, cyclohexanedimethanol and the like; aliphatic or aromatic diamines such as ethylene diamine, piperazine, aminoethylpiperazine, phenylene diamine, diethyltoluenediamine and the like, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like. Among these, the compounds having two phenolic hydroxyl groups are preferred.

The chain extension reaction is performed in the same general manner as the prepolymer-forming reaction. Enough of the prepolymer is mixed with the chain extender to provide at least two equivalents of isocyanate groups per equivalent of isocyanate-reactive groups contributed by the chain extender. Up to 4 or more, preferably up to 3 and more preferably up to 2.5 equivalents of isocyanate groups may be provided per equivalent of isocyanate-reactive groups contributed by the chain extender. An especially preferred amount is from 2 to 2.25 equivalents of isocyanate groups per equivalent of isocyanate-reactive groups contributed by the chain extender. As before, the reaction is preferably performed at an elevated temperature (such as 60 to 120° C.) until a constant isocyanate content is achieved (indicating that all of the isocyanate-reactive groups have been consumed).

The chain-extended prepolymer is terminated with isocyanate groups. The chain-extended prepolymer will include molecules that correspond to a coupling of the starting prepolymer with the chain extender. If more than 2 equivalents of prepolymer are reacted per equivalent of chain extender, the chain-extended prepolymer will also contain some quantity of prepolymer molecules that have not been extended. The chain-extended prepolymer may also contain a small amount of higher molecular weight reaction products. The chain-extended prepolymer preferably has an isocyanate content of from 0.25 to 3% by weight, more preferably from 0.5 to 2.5% by weight and even more preferably from 0.75 to 2% by weight. In terms of isocyanate equivalent weight, a preferred range is from 1400 to 17,000, a more preferred range is from 1680 to 8500, and an even more preferred range is from 2100 to 5700. The chain-extended prepolymer suitably contains, on average, from about 1.5, preferably from about 2.0, to about 6, preferably to about 4, more preferably to about 3 and still more preferably to about 2.5, isocyanate groups per molecule. An especially preferred prepolymer contains an average of from 1.9 to 2.2 isocyanate groups per molecule.

At least 90% of the isocyanate groups of the chain-extended prepolymer are then capped by reaction with a monophenol, a polyphenol or an aminophenol to form the toughener. Examples of suitable monophenol compounds include, for example, phenol, alkyl phenols which contain one or more alkyl groups that each may contain from 1 to 30 carbon atoms, naphthol, or a halogenated phenol or naphthol. Suitable polyphenols contain two or more, preferably two, phenolic hydroxyl groups per molecule. Examples of suitable polyphenols include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Suitable aminophenols are compounds that contain at least one primary or secondary amino group and at least one phenolic hydroxyl group. The amino group is preferably bound to a carbon atom of an aromatic ring. Examples of suitable aminophenols include 2-aminophenol, 4-aminophenol, various aminonaphtols, and the like.

Enough of the phenol, polyphenol or aminophenol compound is provided to cap at least 90%, preferably at least 95%, more preferably at least 98%, up to 100% of the isocyanate groups of the chain extended prepolymer. It is possible to use a mixture of the phenol, polyphenol or aminophenol compound with up to 10 mol-% of another capping agent, such as a monoamine, a ketoxime, an epoxy-functional compound, and the like. However, it is preferred not to employ such other capping agent.

The capping reaction can be performed under the general conditions described already with respect to the prepolymer-forming and chain-extension reactions, i.e., by combining the materials in the stated ratios and heating to 60-120° C., optionally in the presence of a catalyst for the reaction of isocyanate groups with phenol and/or amino groups, as the case may be. The reaction is continued until the isocyanate content is reduced to a constant value, which is preferably less than 0.1% by weight.

The resulting toughener suitably has a number average molecular weight from at least 3000, preferably at least 4,000, to about 35,000, preferably to about 20,000 and more preferably to about 15,000, measured by GPC, taking into account only those peaks that represent molecular weights of 1000 or more.

The polydispersity (ratio of weight average molecular weight to number average molecular weight) is suitably from about 1 to about 4, preferably from about 1.5 to 2.5. The toughener suitably contains, on average, from about 1.5, preferably from about 2.0, to about 6, preferably to about 4, more preferably to about 3 and still more preferably to about 2.5, capped isocyanate groups per molecule. An especially preferred prepolymer contains an average of from 1.9 to 2.2 capped isocyanate groups per molecule.

The toughener should constitute at least 5 weight percent of the adhesive composition. Better results are typically seen when the amount of toughener is at least 8 weight percent or at least 10 weight percent. The toughener may constitute up to 45 weight percent thereof, preferably up to 30 weight percent and more preferably up to 25 weight percent. The amount of toughener that is needed to provide good properties, particularly good low temperature properties, in any particular adhesive composition may depend somewhat on the other components of the composition, and may depend somewhat on the molecular weight of the toughener.

The structural adhesive contains at least one epoxy resin. It is preferred that at least a portion of the epoxy resin is not rubber-modified, by which it is meant specifically that the epoxy resin is not chemically bonded to a rubber. A non-rubber-modified epoxy resin may be added to the structural adhesive as a separate component, i.e., as something other than a component of a rubber-modified epoxy resin product or a part of a dispersion of a core-shell rubber, as described below. In some embodiments of the invention, a core-shell rubber product is used, which may be dispersed in some quantity of epoxy resin. Some amount of non-rubber-modified epoxy resin may be brought into the structural adhesive in that manner. In other embodiments, a rubber-modified epoxy resin product used as a component of the structural adhesive may contain a certain amount of epoxy resin which is not reacted with the rubber (and thus is not rubber-modified). Some non-rubber-modified epoxy resin may be brought into the adhesive in that manner as well.

A wide range of epoxy resins can be used as a non-rubber-modified epoxy resin, including those described at column 2 line 66 to column 4 line 24 of U.S. Pat. No. 4,734,332, incorporated herein by reference. The epoxy resin should have an average of at least 2.0 epoxide groups per molecule.

Suitable epoxy resins include the diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable non-rubber-modified epoxy resins are cycloaliphatic epoxides. A cycloaliphatic epoxide includes a saturated carbon ring having an epoxy oxygen bonded to two vicinal atoms in the carbon ring, as illustrated by the following structure III:

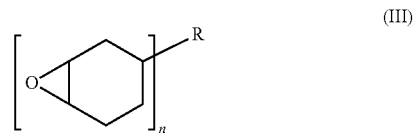

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins. These can have average epoxy equivalent weights of from about 170 to 600 or more, preferably from 225 to 400.

An especially preferred non-rubber-modified epoxy resin is a mixture of at least one diglycidyl ether of a polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the resins are preferably such that the mixture has an average epoxy equivalent weight of from 225 to 400. The mixture optionally may also contain up to 20%, preferably up to 10%, of one or more other non-rubber-modified epoxy resins.

A non-rubber-modified epoxy resin preferably will constitute at least about 25 weight percent of the structural adhesive, more preferably at least about 30 weight percent, and still more preferably at least about 35 part weight percent. The non-rubber-modified epoxy resin may constitute up to about 70 weight percent of the structural adhesive, more preferably up to about 50 weight percent. These amounts include any non-rubber-modified epoxy resin that may be brought into the composition with other components that contain an epoxy resin such as, for example, a diluent or excess, unreacted reagent.

The structural adhesive also contains a curing agent. The curing agent is selected together with any catalysts such that the adhesive cures rapidly when heated to a temperature of 80° C. or greater, preferably 140° C. or greater, but cures very slowly if at all at room temperature (~22° C.) and temperatures up to at least 50° C. Suitable curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

The curing agent is used in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 weight percent of the structural adhesive, more preferably at least about 2.5 weight percent and even more preferably at least 3.0 weight percent. The curing agent preferably constitutes up to about 15 weight percent of the structural adhesive composition, more preferably up to about 10 weight percent, and most preferably up to about 8 weight percent.

The structural adhesive will in most cases contain a catalyst to promote the cure of the adhesive, i.e., the reaction of epoxy groups with epoxide-reactive groups on the curing agent and other components of the adhesive. The catalyst is preferably encapsulated or otherwise a latent type which becomes active only upon exposure to elevated temperatures. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. A preferred catalyst is 2,4,6-tris(dimethylaminomethyl)phenol integrated into a poly(p-vinylphenol) matrix (as described in European patent EP 0 197 892), or 2,4,6-tris(dimethylaminomethyl)phenol integrated into a novolac resin, including those described in U.S. Pat. No. 4,701,378.

Preferably, the catalyst is present in an amount of at least about 0.1 weight percent of the structural adhesive, and more preferably at least about 0.5 weight percent. Preferably, the catalyst constitutes up to about 4 weight percent of the structural adhesive, more preferably up to about 1.5 weight percent, and most preferably up to about 0.9 weight percent.

The structural adhesive of the invention may include at least one liquid rubber-modified epoxy resin. A rubber-modified epoxy resin for purposes of this invention is a reaction product of an epoxy resin and at least one liquid rubber that has epoxide-reactive groups, such as amino or preferably carboxyl groups. The resulting adduct has reactive epoxide groups which allow the adduct to react further when the structural adhesive is cured. It is preferred that at least a portion of the liquid rubber has a glass transition temperature ($T_g$) of −40° C. or lower, especially −50° C. or lower. Preferably, each of the rubbers (when more than one is used) has a glass transition temperature of −25° C. or lower. The rubber $T_g$ may be as low as −100° C. or even lower.

The liquid rubber is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other suitable rubber materials include amine-terminated polyethers, fatty acids (which may be dimerized or oligomerized), and elastomeric polyester.

The rubber is formed into an epoxy-terminated adduct by reaction with an excess of an epoxy resin. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin is used that the resulting product is a mixture of the adduct and some free epoxy resin; any such free epoxy resin counts towards the non-rubber-modified epoxy resin content of the adhesive. Typically, the rubber and an excess of the polyepoxide are mixed together with a polymerization catalyst and heated to a temperature of about 100 to about 250° C. in order to form the adduct. Suitable catalysts include those described before. Preferred catalysts for forming the rubber-modified epoxy resin include phenyl dimethyl urea and triphenyl phosphine.

A wide variety of epoxy resins can be used to make the rubber-modified epoxy resin, including any of those described above. The epoxy resin may be the same or different from that used to prepare the rubber-modified epoxy resin. Preferred polyepoxides are liquid or solid glycidyl ethers of a bisphenol such as bisphenol A or bisphenol F. Halogenated, particularly brominated, resins can be used to impart flame retardant properties if desired. Liquid epoxy resins (such as DER™ 330 and DER™ 331 resins, which are diglycidyl ethers of bisphenol A available from The Dow Chemical Company) are especially preferred for ease of handling.

The rubber-modified epoxy resin(s), if present at all, may constitute about 1 weight percent of the structural adhesive or more, preferably at least about 2 weight percent. The rubber-modified epoxy resin may constitute up to about 25 weight percent of the structural adhesive, more preferably up to about 20 weight percent, and even more preferably up to about 15 weight percent.

The structural adhesive of the invention may contain one or more core-shell rubbers. The core-shell rubber is a particulate material having a rubbery core. The rubbery core preferably has a $T_g$ of less than −20° C., more preferably less than −50° C. and even more preferably less than −70° C. The $T_g$ of the rubbery core may be well below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked or both. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethyl-hexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the non-rubber-modified epoxy resin component of the structural adhesive of the invention.

The core-shell rubber particles can constitute from 0 to 15 weight percent of the structural adhesive.

The total rubber content of the structural adhesive of the invention can range from as little as 0 weight percent to as high as 30 weight percent. A preferred rubber content for a crash durable adhesive is from 1 weight percent to as much as 20 weight percent, preferably from 2 to 15 weight percent and more preferably from 4 to 15 weight percent.

Total rubber content is calculated for purposes of this invention by determining the weight of core-shell rubber (if any), plus the weight contributed by the liquid rubber portion of any rubber-modified epoxy resin as may be used. No portion of the elastomeric toughener is considered in calculating total rubber content. In each case, the weight of unreacted (non-rubber-modified) epoxy resins and/or other carriers, diluents, dispersants or other ingredients that may be contained in a core-shell rubber product or rubber-modified epoxy resin is not included. The weight of the shell portion of the core-shell rubber is counted as part of the total rubber content for purposes of this invention.

The structural adhesive of the invention may contain various other optional components.

The speed and selectivity of the cure can be enhanced and adjusted by incorporating a monomeric or oligomeric, addition polymerizable, ethylenically unsaturated material into the structural adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive as well, in order to provide a source of free radicals to polymerize this material. The inclusion of an ethylenically unsaturated material of this type provides the possibility of effecting a partial cure of the structural adhesive through selective polymerization of the ethylenic unsaturation.

At least one filler, rheology modifier and/or pigment is preferably present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™, and those sold by Akzo Nobel under the trade designation Expancel™.

Fillers, pigment and rheology modifiers are preferably are used in an aggregate amount of about 2 parts per hundred parts of adhesive composition or greater, more preferably about 5 parts per hundred parts of adhesive composition or greater. They preferably are present in an amount of up to about 25 weight percent of the structural adhesive, more preferably up to about 20 weight percent, and most preferably up to about 15 weight percent.

The structural adhesive can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

The adhesive composition of the invention is surprisingly storage-stable. The viscosity of the newly-formulated adhesive composition is usually somewhat higher than what is seen when the toughener is not chain extended. However, the adhesive composition of the invention thereafter builds viscosity at a significantly slower rate upon storage. The rate of viscosity build is often such that after several weeks of storage, the viscosity of the adhesive of this invention is often equal to or even lower than that of the conventional adhesive that contains the non-chain extended toughener. The amount of time at which the adhesive of the invention can be aged yet still be usable generally will exceed that of an otherwise like adhesive that contains a toughener that is not chain-extended. This advantage is seen despite the known tendency (as described, for example, in EP 1 498 441 and WO 2007/003650) of adhesives that contain phenol, polyphenol or aminophenol capped tougheners to have poor storage stability.

The adhesive composition can be applied by any convenient technique. It can be applied cold or be applied warm if desired. It can be applied by extruding it from a robot into bead form on the substrate, it can be applied using mechanical application methods such as a caulking gun, or any other manual application means, and it can also be applied using jet spraying methods such as a streaming method or a swirl technique. The swirl technique is applied using an apparatus well known to one skilled in the art such as pumps, control systems, dosing gun assemblies, remote dosing devices and application guns. Preferably, the adhesive is applied to the substrate using a jet spraying or streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably about 140° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Assembled automotive frame members are usually coated with a coating material that requires a bake cure. The coating is typically baked at temperatures that may range from 140° C. to over 200° C. In such cases, it is often convenient to apply the structural adhesive to the frame components, then apply the coating, and cure the adhesive at the same time the coating is baked and cured.

The adhesive composition once cured preferably has a Young's modulus, at 23° C., of about 1000 MPa as measured according to DIN EN ISO 527-1. Preferably the Young's modulus is about 1200 MPa or greater, more preferably at least 1500 MPa. Preferably, the cured adhesive demonstrates a tensile strength at 23° C. of about 20 MPa or greater, more preferably about 25 MPa or greater, and most preferably about 35 MPa or greater. Preferably, the lap shear strength of a 1.5 mm thick cured adhesive layer on cold rolled steel (CRS) and a galvanized coated steed at 23° C. is about 15 MPa or greater, more preferably about 20 MPa or greater, and most preferably about 25 MPa or greater measured according to DIN EN 1465. The impact peel strength at 23° C. on those substrates is preferably at least 20 N/mm, more preferably at least 30 N/mm and still more preferably at least 40 N/mm, when measured according to the ISO 11343 wedge impact method.

The cured adhesive of the invention demonstrates excellent adhesive properties (such as lap shear strength and impact peel strength).

The following examples are provided to illustrate the invention but are not intended to limit the scope thereof. All parts and percentages are by weight unless otherwise indicated.

EXAMPLE 1 AND COMPARATIVE SAMPLE A

Toughener 1 is prepared by heating to 60° C., under nitrogen, 71.5 parts of a 2900 molecular weight polytetrahydrofuran, and mixing the heated polyol at 60° C. with 8.3 parts 1,6-hexamethylene diisocyanate. After mixing for 2 minutes, 0.06 parts of dibutyl tindilaurate are added and the mixture is allowed to react under nitrogen at 85° C. for 45 minutes. The resulting prepolymer has an isocyanate content of 2.6%.

The prepolymer is then mixed with 3.8 parts of o,o'-diallylbisphenol A and allowed to react for 40 minutes at 85° C., again under nitrogen, to form a chain-extended prepolymer having an isocyanate content of 1.2%.

The chain-extended prepolymer is then mixed with 16.3 parts of o,o'-diallylbisphenol A under nitrogen. The mixture is allowed to stir at 85° C. for 25 minutes to cap the remaining isocyanate groups on the chain-extended prepolymer. The isocyanate content is reduced to zero. The resulting toughener (Toughener 1) is degassed under vacuum. It has a number average molecular weight ($M_n$) of 10,200 and a weight average molecular weight ($M_w$) of 24,000.

Toughener A is prepared by heating to 60° C., under nitrogen, 72.8 parts of a 2900 molecular weight polytetrahydrofuran, and mixing the heated polyol at 60° C. with 7.6 parts 1,6-hexamethylene diisocyanate. After mixing for 2 minutes, 0.06 parts of dibutyl tindilaurate are added and the mixture is allowed to react under nitrogen at 85° C. for 45 minutes. The resulting prepolymer has an isocyanate content of 2.0%.

The prepolymer is then mixed with 19.6 parts of o,o'-diallylbisphenol A under nitrogen. The mixture is allowed to stir at 85° C. for 20 minutes to cap the remaining isocyanate groups on the chain-extended prepolymer. The isocyanate content is reduced to zero. Toughener A has an $M_n$ of 8700 and an $M_w$ of 17,500.

Adhesive Example 1 and Comparative Sample A are prepared by blending ingredients as indicated in Table 1:

TABLE 1

| Component | Parts By Weight | |
|---|---|---|
| | Ex. 1 | Comp. Sample A |
| Epoxy resin blend[1] | 55.6 | 55.6 |
| Epoxy-terminated rubber[2] | 13.2 | 13.2 |
| Toughener 1 | 14.0 | 0 |
| Toughener A | 0 | 14.0 |
| Versatic acid monoepoxy ester[3] | 1.2 | 1.2 |
| Fillers/Colorants | 5.5 | 5.5 |
| Fumed Silica | 5.2 | 5.2 |
| Accelerator[4] | 1.0 | 1.0 |
| Dicyandiamide | 4.3 | 4.3 |

[1] A 63:37.0 by weight blend of liquid diglycidyl ethers of bisphenol A having an epoxy equivalent weight of about 182-187 and a solid reaction product of epichlorohydrin and bisphenol A having an epoxy equivalent weight of 475-550.
[2] An adduct of a carboxyl-terminated butadiene-acrylonitrile rubber (Hycar ™X13), bisphenol A based epoxy resin and cashew nut oil.
[3] Cardura ™ E10, available from Christ Chemie.
[4] Tris (2,4-dimethylaminomethyl)phenol in a poly(vinylphenol) matrix.

Storage stability is evaluated by storing duplicate samples of each of Adhesive Example 1 and Comparative Sample A in sealed containers under nitrogen for various periods of time, at various temperatures from about 40° C. to 60° C. Viscosity measurements are made at the start of testing and after storing at the specified temperatures for the indicated periods of time. Testing is performed on a Bohlin CS-50 rheometer and a 4°/20 mm plate/cone system. The samples are conditioned at 45° C. for five minutes. While holding the sample at this temperature, the shear rate is increased from 0.1/second to 20/second over five minutes, and then decreased back to 0.1/second at the same rate. Viscosity is measured at a shear rate of 10/second on the up-swing. Results are as indicated in Table 2.

TABLE 2

| Storage Conditions (Temperature, time) | Initial Viscosity, Pa·s (10/sec) | Final Viscosity, Pa·s (10/sec) | Ratio, Final/Initial Viscosity | % Increase** |
|---|---|---|---|---|
| 40° C., 12 weeks | | | | |
| Ex. 1 | 220 | 342 | 1.55 | 55% |
| Comp. Sample A* | 154 | 451 | 2.93 | 193% |
| 50° C., 6 weeks | | | | |
| Ex. 1 | 220 | 516 | 2.35 | 135% |
| Comp. Sample A* | 154 | 622 | 4.04 | 304% |
| 60° C., 3 weeks | | | | |
| Ex. 1 | 220 | 1355 | 6.16 | 516% |
| Comp. Sample A* | 154 | 1437 | 9.33 | 833% |

*Not an example of the invention.
**Calculated as 100% × [(final viscosity − initial viscosity)/initial viscosity].

As shown by the data in Table 2, the adhesive of the invention has a somewhat higher initial viscosity than Comparative Sample A, but is much more storage stable at each of the temperatures tested. In all cases, the viscosity of Comparative Sample A increases at a much faster rate than that of Example 1, and in all cases reaches a higher absolute value at the end of the test period. These results indicate that Adhesive Example 1 has a longer shelf life over a range of temperatures than does Comparative Sample A, despite having a higher starting viscosity.

EXAMPLE 2 AND COMPARATIVE SAMPLE B

Toughener 2 is prepared by heating to 60° C., under nitrogen, 82.2 parts of a 2900 molecular weight polytetrahydrofuran, and mixing the heated polyol at 60° C. with 9.5 parts 1,6-hexamethylene diisocyanate. After mixing for 2 minutes, 0.06 parts of dibutyl tindilaurate are added and the mixture is allowed to react under nitrogen at 85° C. for 45 minutes. The resulting prepolymer has an isocyanate content of 2.6%.

The prepolymer is then mixed with 4.4 parts of o,o'-diallylbisphenol A and allowed to react for 40 minutes at 85° C., again under nitrogen, to form a chain-extended prepolymer having an isocyanate content of 1.2%.

The chain-extended prepolymer is then mixed with 3.8 parts of o-allylphenol under nitrogen. The mixture is allowed to stir at 85° C. for 25 minutes to cap the remaining isocyanate groups on the chain-extended prepolymer. The isocyanate content is reduced to zero. The resulting toughener (Toughener 2) is degassed under vacuum. Toughener 2 has an $M_n$ of 9800 and an $M_w$ of 22,800.

Toughener B is prepared by heating to 60° C., under nitrogen, 85.2 parts of a 2900 molecular weight polytetrahydrofuran, and mixing the heated polyol at 60° C. with 8.7 parts 1,6-hexamethylene diisocyanate. After mixing for 2 minutes, 0.06 parts of dibutyl tindilaurate are added and the mixture is allowed to react under nitrogen at 85° C. for 45 minutes. The resulting prepolymer has an isocyanate content of 2.0%.

The prepolymer is then mixed with 6.1 parts of o-allylphenol under nitrogen. The mixture is allowed to stir at 85° C. for 20 minutes to cap the remaining isocyanate groups on the chain-extended prepolymer. The isocyanate content is reduced to zero. Toughener B has an $M_n$ of 7100 and an $M_w$ of 13,500.

One-part, heat-activated adhesive formulations are prepared from each of Toughener 2 and Toughener B. The formulation for Example 2 is the same as shown in Table 1 for Example 1, except that Toughener 1 is replaced by an equal amount of Toughener 2. Comparative Sample B is the same as Comparative Sample A, except that Toughener A is replaced by an equal amount of Toughener B.

Storage stability for Example 2 and Comparative Sample B are evaluated in the same manner described before, with results as indicated in Table 3.

TABLE 3

| Storage Conditions (Temperature, time) | Initial Viscosity, Pa·s (10/sec) | Final Viscosity, Pa·s (10/sec) | Ratio, Final/Initial Viscosity | % Increase** |
|---|---|---|---|---|
| 40° C., 12 weeks | | | | |
| Ex. 2 | 152 | 281 | 1.85 | 85% |
| Comp. Sample B* | 96 | 213 | 2.22 | 122% |
| 50° C., 6 weeks | | | | |
| Ex. 2 | 152 | 384 | 2.53 | 153% |
| Comp. Sample B* | 96 | 280 | 2.92 | 192% |
| 60° C., 3 weeks | | | | |
| Ex. 2 | 152 | 720 | 4.74 | 374% |
| Comp. Sample B* | 96 | 604 | 6.29 | 529% |

*Not an example of the invention.
**Calculated as 100% × [(final viscosity − initial viscosity)/initial viscosity].

At each temperature tested, Example 2 builds viscosity more slowly than does Comparative Sample B.

EXAMPLE 3 AND COMPARATIVE SAMPLE C

Toughener 3 is prepared by heating to 60° C., under nitrogen, 67.6 parts of a 2900 molecular weight polytetrahydrofuran, and mixing the heated polyol with 0.4 trimethylolpropane until homogeneous. At 60° C., 9.3 parts of 1,6-hexamethylene diisocyanate are added. After mixing for 2 minutes, 0.06 parts of dibutyl tindilaurate are added and the mixture is allowed to react under nitrogen at 85° C. for 45 minutes. The resulting prepolymer has an isocyanate content of 3.0%.

The prepolymer is then mixed with 4.3 parts of o,o'-diallylbisphenol A and allowed to react for 40 minutes at 85° C., again under nitrogen, to form a chain-extended prepolymer having an isocyanate content of 1.4%.

The chain-extended prepolymer is then mixed with 18.4 parts of o,o'-diallylbisphenol A under nitrogen. The mixture is allowed to stir at 85° C. for 25 minutes to cap the remaining isocyanate groups on the chain-extended prepolymer. The isocyanate content is reduced to zero. The resulting toughener (Toughener 3) is degassed under vacuum. Toughener 3 has an $M_n$ of 10,900 and an $M_w$ of 30,750.

Toughener C is prepared by heating to 60° C., under nitrogen, 70.9 parts of a 2900 molecular weight polytetrahydrofuran, and mixing the heated polyol with 0.5 parts of trimethylolpropane until homogeneous. At 60° C., 8.2 parts 1,6-hexamethylene diisocyanate are added. After mixing for 2 minutes, 0.06 parts of dibutyl tindilaurate are added and the mixture is allowed to react under nitrogen at 85° C. for 45 minutes. The resulting prepolymer has an isocyanate content of 2.0%.

The prepolymer is then mixed with 20.3 parts of o,o'-diallylbisphenol A under nitrogen. The mixture is allowed to stir at 85° C. for 20 minutes to cap the remaining isocyanate groups on the chain-extended prepolymer. The isocyanate content is reduced to zero. Toughener C has an $M_n$ of 9700 and an $M_w$ of 27,200.

One-part, heat-activated adhesive formulations are prepared from each of Toughener 3 and Toughener C. The formulation for Example 3 is the same as shown in Table 1 for Example 1, except that Toughener 1 is replaced by an equal amount of Toughener 3. Comparative Sample C is the same as Comparative Sample A, except that Toughener A is replaced by an equal amount of Toughener C.

Storage stability is evaluated for each of these as before, with results being as indicated in Table 4.

EXAMPLE 4 AND COMPARATIVE SAMPLE D

Toughener 4 is prepared by heating to 60° C., under nitrogen, 79.2 parts of a 2900 molecular weight polytetrahydrofuran, and mixing the heated polyol with 0.5 parts of trimethylolpropane until homogeneous. At 60° C., 10.9 parts 1,6-hexamethylene diisocyanate are added. After mixing for 2 minutes, 0.06 parts of dibutyl tindilaurate are added and the mixture is allowed to react under nitrogen at 85° C. for 45 minutes. The resulting prepolymer has an isocyanate content of 3.0%.

The prepolymer is then mixed with 5.0 parts of o,o'-diallylbisphenol A and allowed to react for 40 minutes at 85° C., again under nitrogen, to form a chain-extended prepolymer having an isocyanate content of 3.0%.

The chain-extended prepolymer is then mixed with 4.4 parts of o-allylphenol under nitrogen. The mixture is allowed to stir at 85° C. for 25 minutes to cap the remaining isocyanate groups on the chain-extended prepolymer. The isocyanate content is reduced to zero. The resulting toughener (Toughener 4) is degassed under vacuum. Toughener 4 has an $M_n$ of 8700 and an $M_w$ of 27,100.

Toughener D is prepared by heating to 60° C., under nitrogen, 83.6 parts of the polytetrahydrofuran, and mixing the heated polyol with 0.6 parts of trimethylolpropane homogeneous. At 60° C., 9.7 parts 1,6-hexamethylene diisocyanate are added. After mixing for 2 minutes, 0.06 parts of dibutyl tindilaurate are added and the mixture is allowed to react under nitrogen at 85° C. for 45 minutes. The resulting prepolymer has an isocyanate content of 2.0%. The prepolymer is then mixed with 6.1 parts of o-allylphenol under nitrogen. The mixture is allowed to stir at 85° C. for 20 minutes to cap the remaining isocyanate groups on the chain-extended prepolymer. The isocyanate content is reduced to zero.

One-part, heat-activated adhesive formulations are prepared from each of Toughener 4 and Toughener D. The formulation for Example 4 is the same as shown in Table 1 for Example 1, except that Toughener 1 is replaced by an equal amount of Toughener 4. Comparative Sample D is the same as Comparative Sample A, except that Toughener A is replaced by an equal amount of Toughener D. Toughener D has an $M_n$ of 7600 and an $M_w$ of 19,700.

Storage stability is evaluated for each of these as before, with results being as indicated in Table 5.

TABLE 4

| Storage Conditions (Temperature, time) | Initial Viscosity, Pa·s (10/sec) | Final Viscosity, Pa·s (10/sec) | Ratio, Final/Initial Viscosity | % Increase** |
|---|---|---|---|---|
| 40° C., 24 weeks | | | | |
| Ex. 3 | 274 | 1275 | 4.65 | 365% |
| Comp. Sample C* | 199 | 1704 | 8.56 | 756% |
| 50° C., 8 weeks | | | | |
| Ex. 3 | 274 | 875 | 3.19 | 219% |
| Comp. Sample C* | 199 | 1273 | 6.40 | 540% |
| 60° C., 3 weeks | | | | |
| Ex. 3 | 274 | 1279 | 4.67 | 367% |
| Comp. Sample C* | 199 | 1822 | 9.16 | 816% |

*Not an example of the invention.
**Calculated as 100% × [(final viscosity − initial viscosity)/initial viscosity].

TABLE 5

| Storage Conditions (Temperature, time) | Initial Viscosity, Pa·s (10/sec) | Final Viscosity, Pa·s (10/sec) | Ratio, Final/Initial Viscosity | % Increase** |
|---|---|---|---|---|
| 40° C., 24 weeks | | | | |
| Ex. 4 | 188 | 642 | 3.41 | 241% |
| Comp. Sample D* | 110 | 798 | 7.25 | 625% |
| 50° C., 12 weeks | | | | |
| Ex. 4 | 188 | 1424 | 7.57 | 657% |
| Comp. Sample D* | 110 | 1690 | 15.36 | 1436% |
| 60° C., 4 weeks | | | | |
| Ex. 4 | 188 | 1540 | 8.19 | 719% |
| Comp. Sample D* | 110 | Gelled | NM | NM |

*Not an example of the invention.
**Calculated as 100% × [(final viscosity − initial viscosity)/initial viscosity].
NM—not meaningful, as the aged adhesive has solidified.

As shown by the data in Table 4, the adhesive of the invention has a somewhat higher initial viscosity, but is much more storage stable at each of the temperatures tested. In all cases, the viscosity of the Comparative Adhesive increases at a much faster rate than that of Example 3, and in all cases reaches a higher absolute value at the end of the test period.

As shown by the data in Table 6, the adhesive of the invention has a somewhat higher initial viscosity, but is much more storage stable at each of the temperatures tested. In all cases, the viscosity of the Comparative Adhesive D increases at a much faster rate than that of Example 4, and in all cases reaches a higher absolute value at the end of the test period.

EXAMPLES 5-7

Toughener 5 is prepared by heating to 60° C., under nitrogen, 76.1 parts of a 2000 molecular weight polytetrahydrofuran, and mixing the heated polyol at 60° C. with 12.8 parts 1,6-hexamethylene diisocyanate. After mixing for 2 minutes, 0.06 parts of dibutyl tindilaurate are added and the mixture is allowed to react under nitrogen at 85° C. for 45 minutes. The resulting prepolymer has an isocyanate content of 3.6%.

The prepolymer is then mixed with 5.9 parts of o,o'-diallylbisphenol A and allowed to react for 40 minutes at 85° C., again under nitrogen, to form a chain-extended prepolymer having an isocyanate content of 1.7%.

The chain-extended prepolymer is then mixed with 5.2 parts of o-allylphenol under nitrogen. The mixture is allowed to stir at 85° C. for 25 minutes to cap the remaining isocyanate groups on the chain-extended prepolymer. The isocyanate content is reduced to zero. The resulting toughener (Toughener 5) is degassed under vacuum. Toughener 5 has an $M_n$ of 7600 and an $M_w$ of 18,200.

Toughener 6 is made in the same manner as Toughener 5, using 63.4 parts of the polyol, 10.7 parts of the isocyanate, 0.06 parts of the catalyst, 4.9 parts of o,o'-diallylbisphenol A in the chain extension step, and 21.0 parts of o,o'-diallylbisphenol A in the capping step. Toughener 6 has an $M_n$ of 5900 and an $M_w$ of 13,700.

Toughener 7 is prepared by heating to 60° C., under nitrogen, 60.1 parts of a 2000 molecular weight polytetrahydrofuran, and mixing the heated polyol with 0.4 parts of trimethylolpropane until homogeneous. At 60° C., 11.6 parts 1,6-hexamethylene diisocyanate are added. After mixing for 2 minutes, 0.06 parts of dibutyl tindilaurate are added and the mixture is allowed to react under nitrogen at 85° C. for 45 minutes. The resulting prepolymer has an isocyanate content of 4.0%. Toughener 7 has an $M_n$ of 7200 and an $M_w$ of 23,800.

The prepolymer is then mixed with 5.3 parts of o,o'-diallylbisphenol A and allowed to react for 40 minutes at 85° C., again under nitrogen, to form a chain-extended prepolymer having an isocyanate content of 1.9%.

The chain-extended prepolymer is then mixed with 22.6 parts of o,o'-diallylbisphenol A under nitrogen. The mixture is allowed to stir at 85° C. for 25 minutes to cap the remaining isocyanate groups on the chain-extended prepolymer. The isocyanate content is reduced to zero. The resulting toughener (Toughener 7) is degassed under vacuum.

One-part, heat-activated adhesive formulations are prepared from each of Toughener 5-7. The formulations for Examples 5-7 are the same as shown in Table 1 for Example 1, except that Toughener 1 is replaced by an equal amount of Toughener 5-7, respectively.

Storage stability is evaluated for each of these as before, with results being as indicated in Table 6.

TABLE 6

| Storage Conditions (Temperature, time) | Initial Viscosity, Pa·s (10/sec) | Final Viscosity, Pa·s (10/sec) | Ratio, Final/Initial Viscosity | % Increase** |
|---|---|---|---|---|
| 40° C., 8 weeks | | | | |
| Ex. 5 | 170 | 250 | 1.47 | 47% |
| Ex. 6 | 173 | 234 | 1.35 | 35% |
| Ex. 7 | 220 | 252 | 1.15 | 15% |
| 50° C., 6 weeks | | | | |
| Ex. 5 | 170 | 324 | 1.91 | 91% |
| Ex. 6 | 173 | 450 | 2.60 | 160% |
| Ex. 7 | 220 | 532 | 2.42 | 142% |

**Calculated as 100% × [(final viscosity − initial viscosity)/initial viscosity].
NM—not meaningful, as the aged adhesive has solidified.

The data in Table 6 shows that the benefit of improved storage stability is seen across a variety of toughener compositions.

Impact peel testing is performed for adhesive Examples 1-7, and for two commercially available structural adhesive products (Comparative Adhesives E and F). The substrate is 1.5 mm 14O3 steel. The impact peel testing is performed in accordance with ISO 11343 wedge impact method. Testing is performed at an operating speed of 2 m/sec. Impact peel testing is performed at 23° C., and strength in N/mm is measured.

Test coupons for the impact peel testing are 90 mm×20 mm with a bonded area of 30×20 mm. The samples are prepared by wiping them with acetone. Teflon tape is applied to the coupons to define the bond area. The structural adhesive is then applied to the bond area of one coupon and squeezed onto the other coupon to prepare each test specimen. The adhesive layer is 0.2 mm thick. Duplicate samples are cured for 30 minutes at 180° C.

Duplicate test coupons are prepared and are evaluated for lap shear strength in accordance with DIN ISO 1465. The substrate is 1.0 mm cold rolled steel grade BCO4. Testing is performed at a test speed of 10 mm/minute. Testing is performed at 23° C. Test samples are prepared using each adhesive. The bonded area in each case is 25×10 mm. The adhesive layer is 0.2 mm thick. Duplicate test specimens are cured for 30 minutes at 180° C.

The glass transition temperature of a sample of the cured adhesive is measured by DSC. The glass transition temperature ($T_g$) and the results of the impact peel and lap shear testing are as shown in Table 7.

TABLE 7

| | $T_g$, ° C. | Lap shear strength, MPa | Impact peel strength, RT, N/mm, energy (J) |
|---|---|---|---|
| Ex. 1 | 90 | 35.5 | 56 (21) |
| Ex. 2 | 97 | 30.2 | 47 (17) |
| Ex. 3 | 93 | 36.7 | 57 (22) |
| Ex. 4 | 93 | 32.4 | 54 (20) |
| Ex. 5 | 89 | 35.5 | 60 (22) |
| Ex. 6 | 88 | 37.6 | 54 (21) |
| Ex. 7 | 86 | 38.2 | 55 (20) |
| Comparative Adhesive E | 94 | 32.1 | 57 (22) |
| Comparative Adhesive F | 87 | 31.5 | 44 (16) |

The data in Table 7 indicates that adhesives in accordance with the invention have, when cured, properties comparable to or better than the commercially available adhesives. In particular, lap shear and impact peels strengths are increased significantly in many cases.

The invention claimed is:
1. A one-part structural adhesive comprising:
   A) at least one epoxy resin;
   B) a reactive elastomeric toughener containing capped isocyanate groups; and
   C) one or more epoxy curing agents;

wherein all reactive elastomeric tougheners containing capped isocyanate groups present in the one-part structural adhesive are formed by
a) reacting an excess of a polyisocyanate with a 300-3000 equivalent weight polyol or with a mixture of a 300-3000 equivalent weight polyol and a branching agent, to form an isocyanate-terminated prepolymer;
b) reacting the isocyanate-terminated prepolymer with a chain extender to produce a chain extended, isocyanate-terminated prepolymer, and
c) capping 100% of the terminal isocyanate groups of the chain extended, isocyanate-terminated prepolymer with a capping agent selected from a monophenol, a polyphenol and an aminophenol.

2. The structural adhesive of claim 1, wherein the 300-3000 equivalent weight polyol is a polyether, a hydroxyl-terminated polybutadiene or a mixture of a polyether and a hydroxyl-terminated polybutadiene.

3. The structural adhesive of claim 1, wherein the chain extender contains two phenolic hydroxyl groups.

4. The structural adhesive of claim 1 wherein the capping agent is a monophenol.

5. The structural adhesive of claim 1 wherein the capping agent is a polyphenol.

6. The structural adhesive of claim 1 wherein the capping agent is an aminophenol.

7. The structural adhesive of claim 1, wherein the epoxy resin includes at least one diglycidyl ether of a polyhydric phenol.

8. The structural adhesive of claim 1, which contains at least one epoxide-terminated liquid rubber.

9. The structural adhesive of claim 1, further comprising a latent catalyst which becomes active only upon exposure to elevated temperatures.

10. The structural adhesive of claim 9 wherein the latent catalyst is 2,4,6-tris(dimethylaminomethyl)phenol integrated into a poly(p-vinylphenol) matrix or 2,4,6-tris(dimethylaminomethyl)phenol integrated into a novolac resin.

11. The structural adhesive of claim 1 wherein the curing agent includes one or more of a boron trichloride/amine complex, a boron trifluoride/amine complex, dicyandiamide, melamine, diallylmelamine, acetoguanamine, benzoguanamine, 3-amino-1,2,4-triazole, adipic dihydrazide, stearic dihydrazide, isophthalic dihydrazide, semicarbazide, cyanoacetamide, and diaminodiphenylsulphones.

12. The structural adhesive of claim 1 further comprising one or more of calcium carbonate, calcium oxide, talc, carbon black, textile fibers, glass particles, glass fibers, aramid pulp, boron fibers, carbon fibers, a mineral silicate, mica, powdered quartz, hydrated aluminum oxide, bentonite, wollastonite, kaolin, fumed silica, silica aerogel, a polyurea compound, a polyamide compound, aluminum powder, iron powder, and microballoons having an average particle size of up to 200 microns and density of up to 0.2 g/cc.

13. A method comprising applying the structural adhesive of claim 1 to the surfaces of two members, and curing the structural adhesive to form an adhesive bond between the two members.

14. A one-part structural adhesive comprising:
A) at least one epoxy resin;
B) a reactive elastomeric toughener containing capped isocyanate groups; and
C) one or more epoxy curing agents;
wherein all reactive elastomeric tougheners containing capped isocyanate groups present in the one-part structural adhesive are formed by
a) reacting an excess of 1,6-hexamethylene diisocyanate with a 300-3000 equivalent weight polytetrahydrofuran, to form an isocyanate-terminated prepolymer;
b) reacting the isocyanate-terminated prepolymer with o,o'-diallylbisphenol A to produce a chain extended, isocyanate-terminated prepolymer, and
c) capping 100% of the terminal isocyanate groups of the chain extended, isocyanate-terminated prepolymer with a capping agent selected from o,o'-diallylbisphenol A and allylphenol.

* * * * *